United States Patent [19]
Suzuki et al.

[11] Patent Number: 5,800,056
[45] Date of Patent: Sep. 1, 1998

[54] APPARATUS FOR DILUTING A SOLUTION AND METHOD FOR THE SAME

[75] Inventors: Takao Suzuki, Akashi; Naomiki Kojoh; Yoshiyasu Takahashi, both of Kakogawa, all of Japan

[73] Assignee: Toa Medical Electronics Co., Ltd., Hyogo, Japan

[21] Appl. No.: 674,729

[22] Filed: Jul. 2, 1996

[30] Foreign Application Priority Data

Jul. 19, 1995 [JP] Japan ................................. 7-182930

[51] Int. Cl.⁶ .................................................. G05D 11/08
[52] U.S. Cl. ........................... 366/152.4; 366/160.3; 137/5
[58] Field of Search ........................... 366/132, 134, 366/151.1, 152.1, 152.2, 152.4, 152.6, 160.1, 160.3, 160.5, 168.1, 177.1, 179.1, 181.6, 181.8, 192; 137/5, 88, 93

[56] References Cited

U.S. PATENT DOCUMENTS

| | | |
|---|---|---|
| 3,987,808 | 10/1976 | Carbonell et al. |
| 4,031,912 | 6/1977 | Lu et al. ........................ 137/5 |
| 4,212,545 | 7/1980 | Lovasz et al. ................ 366/152.4 |
| 4,403,866 | 9/1983 | Falcoff et al. |
| 4,474,476 | 10/1984 | Thomsen ....................... 366/152.4 |
| 4,483,357 | 11/1984 | Rao et al. |
| 4,858,449 | 8/1989 | Lehn . |
| 4,877,522 | 10/1989 | Toei et al. |
| 5,522,660 | 6/1996 | O'Dougherty et al. ...... 366/160.2 X |

FOREIGN PATENT DOCUMENTS 62-225239  10/1987  Japan .
6142482   5/1994  Japan .

OTHER PUBLICATIONS

Patent Abstracts of Japan—vol. 018, No. 456 (C–1242), 25 Aug. 1994 & JP-A-06 142482 (Nikkiso Co Ltd), 24 May 1994.

Primary Examiner—Charles E. Cooley

[57] ABSTRACT

An apparatus for diluting a solution comprises a preparation vessel for mixing a solution with a diluent to dilute the solution, a solution supply unit, a diluent supply unit, and a controller. The controller controls the solution supply unit and the diluent supply units to supply the solution and diluent into the preparation vessel in such quantity that the concentration of the diluted solution is higher than a desired concentration. The controller also calculates an additional quantity of the diluent necessary for diluting the solution in the preparation vessel to the desired concentration based on a difference between the concentration of the solution in the preparation vessel and the desired concentration, and controls the diluent supply unit to add the diluent into the preparation vessel in smaller quantity than the calculated additional quantity and repeats the calculation and addition until the solution concentration in the preparation vessel reaches the desired concentration.

10 Claims, 2 Drawing Sheets

APPARATUS FOR DILUTING A SOLUTION AND METHOD FOR THE SAME

BACKGROUND OF THE INVENTION

1. Field of the Invention

The present invention relates to an apparatus for diluting a solution, particularly an apparatus for preparing a solution with a desired concentration by diluting the solution having a high concentration and then supplying the diluted solution to clinical analyzers.

2. Description of Related Art

In recent years, a clinical analyzers such as a blood counter has been automatized, thereby being capable of testing a lot of specimens in a short time. In an institution such as a laboratory in a large-scale hospital or a commercial laboratory where a tremendous number of specimens are tested in a day, a plurality of analyzers are installed and connected by transfer means such as a belt conveyor, by which specimens are distributed to each analyzer.

In each analyzer, a solution for analysis of specimens is supplied from a solution container exchangeably mounted on the analyzer. Therefore, as more analyzers are used or as more specimens are tested, the larger number of solution containers are employed and the more frequently the solution containers have to be exchanged. Thus workers' burden is increased.

Therefore, in institutions using a plurality of analyzers, there is a great demand for an inexpensive apparatus for preparing a solution with a necessary concentration in a lot to supply the individual analyzers. Conventionally known techniques relating to such apparatuses are a dilution supply apparatus for preparing two types of solutions having high and low concentrations, to supply an analyzer with them and a solution supply apparatus for controlling the amount of a reagent in a solution using conductivity of the solution (for example, see Japanese Unexamined Patent Publication Nos. Hei6(1994)-142482 and Sho62(1987)-225239).

However, since the solution concentration directly affects analysis results, good accuracy in dilution is required (for example, within ±0.5%) when a desired solution is to be prepared by diluting the solution having a high concentration. But it has not been easy to achieve satisfactory accuracy with a simple construction at low costs.

SUMMARY OF THE INVENTION

In view of the above situations, it is an object of the present invention to provide a compact, inexpensive apparatus for diluting a solution with good accuracy and a method for the same.

The present invention provides an apparatus for diluting a solution comprising a preparation vessel for mixing a solution with a diluent to dilute the solution, a solution supply unit for measuring a quantity of the solution to supply the solution into the preparation vessel, a diluent supply unit for measuring a quantity of the diluent to supply the diluent into the preparation vessel, a concentration sensor for measuring a concentration of the diluted solution in the preparation vessel and a controller for driving the solution supply unit and the diluent supply unit, in which the controller controls the solution supply unit and the diluent supply units to supply the solution and the diluent into the preparation vessel in such quantity that the concentration of the diluted solution is higher than a desired concentration, calculates an additional quantity of the diluent necessary for diluting the solution in the preparation vessel to the desired concentration based on a difference between the concentration measured by the concentration sensor and the desired concentration, then controls the diluent supply unit to add the diluent into the preparation vessel in smaller quantity than the calculated additional quantity and repeats the calculation and addition until the concentration of the solution in the preparation vessel reaches the desired concentration.

DESCRIPTION OF THE PREFERRED EMBODIMENT

Figure 1:
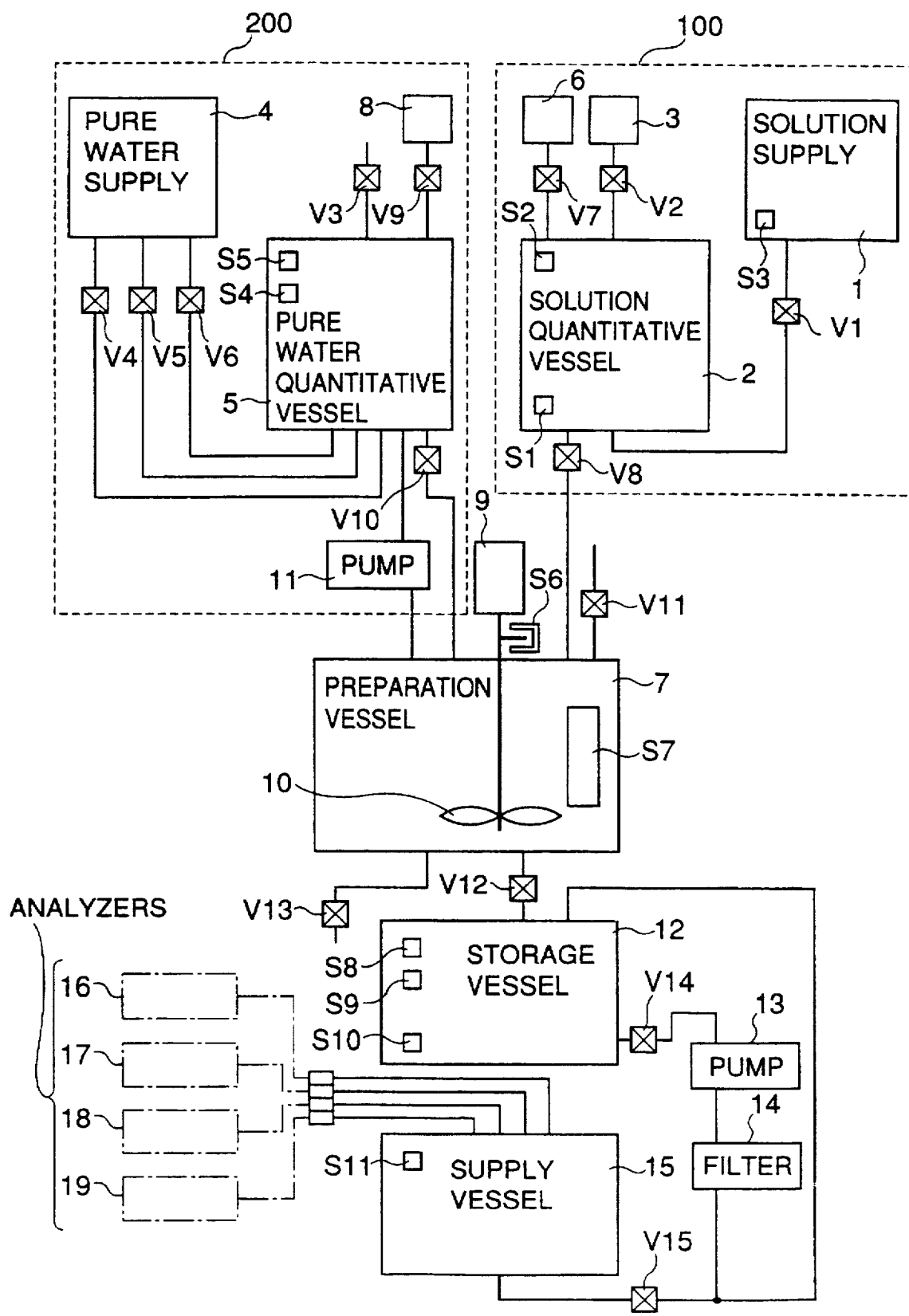
FIG. 1 illustrates the construction of an embodiment of the solution diluting apparatus of the present invention.

The solution to be supplied into the preparation vessel of the present invention usually means a solution having a high concentration which is used after being diluted, for example, an aqueous solution containing sodium chloride or a surfactant used for analysis of blood or leukocytes, and, of course, other solutions containing reagents used for clinical tests.

The solution in the present invention is generally diluted 5 to 25 times and its dilution accuracy may be controlled within about ±0.5 to ±1.5% depending on the kinds of solution.

The present invention is characterized in that, in order to prepare a solution with a desired concentration, a solution with a high concentration is diluted in such a way that the concentration never falls below a desired concentration, because it is difficult to adjust the concentration with good accuracy by adding a high concentration solution, which tends to change greatly the concentration of the solution.

Therefore, in the present invention, a high concentration solution and a diluent are first supplied and mixed in the preparation vessel in such amount that the mixture concentration is clearly higher than a desired concentration. Then the amount of the diluent necessary for the desired concentration is calculated from a difference between the concentration of the mixture and the desired one, and the diluent is added in a little smaller amount than the calculated additional amount. The above calculation and addition are repeated until the mixture concentration falls within a desired range.

The solution supply unit may comprise a solution supplier such as a disposable container containing the high concentration solution and a quantitative vessel and/or a quantitative pump, the solution being measured through the quantitative vessel and/or the quantitative pump and supplied from the solution supplier to the preparation vessel.

The diluent supply unit may comprise a diluent supplier such as a disposable container containing the diluent and quantitative vessel and/or a quantitative pump, the diluent being measured through the quantitative vessel and/or the quantitative pump and supplied from the diluent supplier into the preparation vessel. A purifier for changing tap water into pure water may be employed as the diluent supplier.

In other words, in the apparatus for diluting a solution, the solution supply unit may comprise a solution supplier and a solution quantitative vessel for measuring the solution quantity to be supplied from the solution supplier to the preparation vessel, and the diluent supply unit may comprise a diluent supplier, a diluent quantitative vessel for measuring the diluent quantity to be supplied from the diluent supplier to the preparation vessel and a quantitative pump for measuring the diluent quantity to be added to the preparation vessel from the diluent supplier.

The solution diluting apparatus of the present invention may further comprise a storage vessel for receiving the diluted solution from the preparation vessel and storing the received solution and a solution sensor for detecting the solution in the preparation vessel. And in this case, preferably, the controller performs a transfer of the diluted solution from the preparation vessel to the storage vessel when the solution in the preparation vessel reaches the desired concentration and controls the solution and diluent supply units to supply the solution and diluent into the preparation vessel respectively when the preparation vessel becomes empty in order to restart the dilution of the solution to the desired concentration, so that a large amount of the diluted solution can be stored in the storage vessel.

Preferably the preparation vessel is provided with a stirrer for stirring the solution therein to obtain uniform concentration.

The concentration sensor may comprise a sensor for detecting an electric conductivity of the solution when the solution is electrolyte such as saline.

The preparation vessel may be provided with a drain valve for discharging the solution from the preparation vessel so that the controller operates the drain valve to discharge the solution from the preparation vessel when the solution concentration in the preparation vessel measured by the concentration sensor becomes lower than the desired concentration.

The storage vessel may have a circulation passage with a pump and a filter for purifying the stored solution.

The solution diluting apparatus of the present invention may further comprise a supply vessel for receiving the solution from the storage vessel and supplying the solution to a plurality of analyzers.

The controller may calculate the additional quantity of diluent in terms of the number of operations of the quantitative pump and operate the quantitative pump to add the diluent less times than the calculated number of operations.

The controller can be constituted with a microcomputer including CPU, ROM and RAM.

In another aspect, the present invention provides a method of diluting a solution comprising: providing a preparation vessel for mixing a solution with a diluent to dilute the solution, a solution supply unit for measuring a quantity of the solution to supply the solution into the preparation vessel, a diluent supply unit for measuring a quantity of the diluent to supply the diluent into the preparation vessel and a concentration sensor for measuring a concentration of the diluted solution in the preparation vessel; supplying the solution and diluent into the preparation vessel in such quantity that the concentration of the diluted solution is higher than a desired concentration; calculating an additional quantity of the diluent necessary for diluting the solution in the preparation vessel to the desired concentration based on a difference between the concentration measured by the concentration sensor and the desired concentration; adding the diluent into the preparation vessel in smaller quantity than the calculated additional quantity; and repeating the calculation and addition until the concentration of the solution in the preparation vessel reaches the desired concentration.

The present invention will hereinafter be described in detail according to embodiments thereof shown in the attached drawings. These embodiments are not intended to limit the present invention.

FIG. 1 illustrates the construction of an embodiment of the solution diluting apparatus of the present invention.

In a solution supply unit 100 shown in FIG. 1, a solution supplier 1 usually called CUBITAINER™ is a disposable container having a capacity of about 5000 to 20000 ml. A high-concentrated solution, e.g., concentrated saline for diluting blood in this embodiment, is fed beforehand in the container. The container is exchanged when it becomes empty.

A solution quantitative vessel 2 is made of rigid vinyl chloride, having a capacity of 250 ml. When solenoid valves V1 and V2 open, a vacuum of 300 mmHg is applied to the solution quantitative vessel 2 by a vacuum source 3 and the high-concentrated solution is fed from the solution supplier 1 to the solution quantitative vessel 2.

The solution quantitative vessel 2 is provided with a liquid-level sensor S1 for detecting the lower limit and a liquid-level sensor S2 for detecting the upper limit. The high-concentrated solution in the solution supplier 1 is fed from the bottom of the solution quantitative vessel 2 for preventing the high-concentrated solution from forming bubbles in the solution quantitative vessel 2. Especially, in the case of a solution containing a surfactant, this effect is marked. When the solution supplier 1 is empty, a liquid-level sensor S3 mounted to the solution supplier produces an output.

In a diluent supply unit 200, a pure water supplier 4 comprises a pure water producer to change tap water to pure water, and a pure water quantitative vessel 5 is made of rigid vinyl chloride, having a capacity of 4900 ml. When a solenoid valve V3 is opened, the pressure in the pure water quantitative vessel 5 turns to be atmospheric. Therefore, solenoid valves V4 and V5 with a large capacity are opened to allow pure water into the pure water quantitative vessel 5 until a liquid-level sensor S4 mounted to the pure water quantitative vessel 5 detects the liquid level, and then a solenoid valve V6 with a small capacity is opened to allow pure water to be fed until a liquid-level sensor S5 for detecting the upper limit functions. The combined use of valves with a large capacity and with a small capacity enables accurate quantitative measurement in a short time.

When a solenoid valve V7 is opened, a positive pressure of 2.0 kgf/cm$^2$ is applied to the solution quantitative vessel 2 by a positive pressure source 6. Therefore, by opening a solenoid valve V8, the high-concentrated solution is supplied to a preparation vessel 7 from the solution quantitative vessel 2 until the liquid-level sensor S1 functions.

Then, when a solenoid valve V9 is opened, a positive pressure of 2.0 kgf/cm$^2$ is applied to the pure water quantitative vessel 5 by a positive pressure source 8. Therefore, by opening a solenoid valve V10, pure water is supplied to the preparation vessel 7 from the pure water quantitative vessel 5. The solution quantitative vessel 2 and the pure water quantitative vessel 5, as soon as they become empty, are supplied with the high-concentrated solution and pure water as described above.

The preparation vessel 7 is made of rigid vinyl chloride, having a capacity of 5100 ml. The preparation vessel 7 is provided with a stirring blade 10 which rotates at a speed of 400 rpm by the use of a motor 9, a rotation sensor S6 for detecting the rotation of the stirring blade 10, a concentration sensor S7 for measuring the temperature and electric conductivity of the diluted solution and a solenoid valve V13 for drain. A quantitative pump 11 (diaphragm pump) has a delivery amount of 2.0 ml and is driven by a vacuum and positive pressure sources which are not shown in the figure.

Therefore, by opening the solenoid valve V3 and driving the quantitative pump 11, pure water is supplied by 2.0 ml from the pure water quantitative vessel 5 to the preparation vessel 7.

When the quantity of pure water in the quantitative vessel 5 decreases due to the above supply, pure water is immediately supplied from the pure water supplier 4 and the quantity thereof is measured again.

A storage vessel 12 is made of polyethylene or rigid vinyl chloride, having a capacity of 11000 ml. When a solenoid valve V11 is opened, the pressure in the preparation vessel becomes atmospheric. Then, when a solenoid valve V12 is opened, the solution prepared in the preparation vessel (referred to as prepared liquid hereafter) is all sent to the storage vessel. The storage vessel 12 is provided with a liquid-level sensor S8 for detecting a warning upper limit, a liquid-level sensor S9 for detecting a liquid level at which the prepared liquid is required to be transferred from the preparation vessel 7, and a liquid-level sensor S10 for detecting a warning lower limit.

Usually, the prepared liquid in the storage vessel 12 is circulated and purified through a solenoid valve V14, pump 13 and filter 14. When the liquid-level sensor S10 functions, the circulation stops.

A supply vessel 15 is made of rigid vinyl chloride, having a capacity of 1000 ml. The prepared liquid is supplied to the supply vessel 15 from the storage vessel 12 through the solenoid valve V14, pump 13, filter 14 and a solenoid valve V15. The level of the prepared liquid is maintained at the level of a liquid-level sensor S11. Analyzers 16 to 19 suck a necessary amount of prepared liquid from the supply vessel 15.

Figure 2:
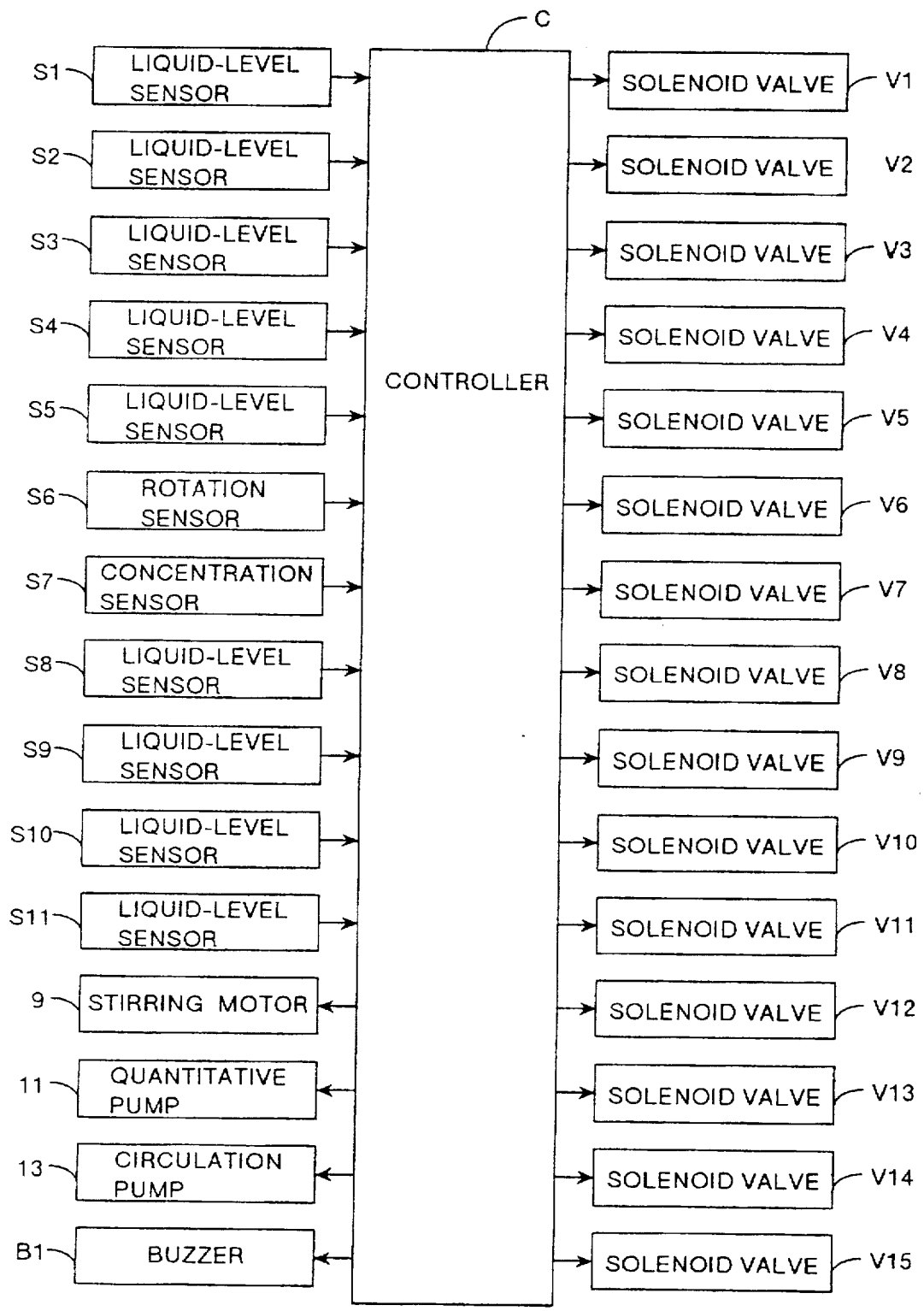
FIG. 2 is a block diagram illustrating a control circuit of the embodiment.

FIG. 2 is a block diagram illustrating a control circuit of the embodiment shown in FIG. 1. A controller C, comprising a microcomputer including CPU, ROM and RAM, receives outputs from the liquid-level sensors S1 to S5, rotation sensor S6, concentration sensor S7 and liquid-level sensors S8 to S11, and controls the drives of the solenoid valves V1 to V15, stirring motor 9, quantitative pump 11, and circulation pump 13 and a buzzer B1.

In such a construction, the high-concentrated solution measured by the solution quantitative vessel 2 and pure water measured by the pure water quantitative vessel 5 are supplied to the preparation vessel 7 and stirred by the stirring blade 10. Then the solution concentration is measured by the concentration sensor S7 and pure water is successively added by the quantitative pump 11 until the solution concentration agrees with the desired concentration. In this embodiment, the high-concentrated solution (saline) is diluted by 25 times with pure water and the dilution accuracy is within ±0.5%.

The solution diluted to the desired concentration (the prepared liquid) is transferred to the storage vessel 12. The transfer of the prepared liquid is repeated until the liquid-level sensor S8 acts to stop the transfer. And the prepared liquid in the storage vessel 12 is supplied to the supply vessel until the liquid-level sensor S11 functions. When the solution supplier 1 becomes empty, the liquid-level sensor S3 produces an output so that the buzzer B1 will produce a warning sound.

Now, the control for diluting a solution with a desired concentration in the preparation vessel with good accuracy will be described in detail.

In dilution of a high-concentrated solution with pure water according to the solution diluting apparatus of the embodiments, the solution is not diluted to a desired concentration at one step, but is first diluted to a higher concentration than the desired concentration in the preparation vessel 7, then diluted by adding a little quantity of pure water with the quantitative pump (diaphragm pump) 11 with monitoring changes of the electric conductivity of the liquid in the vessel until a predetermined electric conductivity is detected. If the electric conductivity falls below the predetermined value, the diluted solution is discharged through the solenoid valve V13 for drain.

The reason for monitoring the electric conductivity in the invention is that the electric conductivity reflects changes of the liquid concentration most sensitively.

The electric conductivity changes as the temperature changes. Therefore, when the electric conductivity is measured as a solution concentration, the temperature must also be measured and the electric conductivity at 25° C. must be calculated with correcting effects by the temperature. Data required for the correction may be stored in ROM of the control means C. The data for correction can be experimentally obtained for each solution. For example, in the case of saline, the electric conductivity rises by 2% per 1° C.

After the high-concentrated solution and pure water are mixed in measured quantity in the preparation vessel 7, stirred for a necessary period (until the mixture becomes uniform), the electric conductivity of the mixture is measured every 2 seconds, and an average of 10 measurements is calculated to give the conductivity of the mixture $\rho 0$ (initial value).

Then the number (T1) of operating the quantitative pump 11 used for supplying a small amount of diluent is calculated by the following formula:

$$T1 = \alpha \times (\rho 0 - \rho M)/V \qquad (1)$$

$\rho 0$: initial electric conductivity $\rho M$: middle value of a range of the desired electric conductivity $V$: change in the electric conductivity caused by one operation of the diaphragm pump $\alpha$: coefficient from 0 to 1 (e.g., 0.8)

V is experimentally obtained beforehand. $\alpha$ is set so that pure water cannot be excessively added (since operating the quantitative pump a number of times sometimes leads to over-added pure water due to accumulated errors). $\alpha$ can be experientially decided.

When the quantitative pump 11 is operated as many times as calculated by formula (1), a corresponding amount of pure water is added to the preparation vessel 7. The mixture is stirred for the necessary period again, the electric conductivity is measured every 2 seconds, and an average of 10 measurements is calculated to give the conductivity of the mixture $\rho 1$. If $\rho 1$ is within the desired range, the dilution is completed.

If $\rho 1$ is higher than the desired range, the number T2 of operating the quantitative pump 11 is calculated by the following formula and the diluent is added the calculated times:

$$T2 = \alpha \times (\rho 1 - \rho M)/V \qquad (2)$$

$\rho 1$: electric conductivity after the first addition

Then, the electric conductivity is measured again. If the electric conductivity is within the desired range, the dilution is completed. The above adding operation is repeated until the electric conductivity falls within the desired range.

Thus, the present invention is characterized in that the concentration can be gradually reduced from a higher value to the desired range with adding a little quantity of pure water. When the concentration is adjusted by adding a high-concentrated solution, otherwise, the concentration changes greatly and therefore accurate adjustment cannot be easily achieved.

According to the present invention, the solution is first diluted to a concentration higher than the desired concentration, an additional quantity of diluent is calculated based on a difference between the concentration of the diluted solution and the desired concentration, and the controller has such a construction that a smaller quantity of diluent than calculated is repeatedly added until the desired concentration is gained. Therefore, it is possible to easily prepare a solution having a right concentration with significant accuracy through a simple construction. Further, since the solution can be prepared in a lot and supplied to analyzers, the number of solution containers to be exchanged and the number of exchanging solution containers can be reduced, thus the burden to workers is reduced. Further, the reduction in the number of used solution containers allows decrease in wastes.

What is claimed is:

1. An apparatus for diluting a solution, comprising:

a preparation vessel for mixing a solution with a diluent to dilute the solution;

a solution supply unit for measuring a quantity of the solution and supplying the measured quantity of the solution into the preparation vessel;

a diluent supply unit for measuring a quantity of the diluent and supplying the measured quantity of the diluent into the preparation vessel;

a concentration sensor for measuring a concentration of the diluted solution in the preparation vessel, said sensor provided inside said preparation vessel; and a controller for controlling the solution supply unit and the diluent supply unit to supply the solution and diluent into the preparation vessel in such quantity that the concentration of the diluted solution is higher than a desired concentration, calculating an additional quantity of the diluent necessary for diluting the solution in the preparation vessel to the desired concentration based on a difference between the concentration measured by the concentration sensor and the desired concentration, and controlling the diluent supply unit to add the diluent into the preparation vessel in smaller quantity than the calculated additional quantity and repeats the calculation and addition until the solution concentration in the preparation vessel reaches the desired concentration wherein said solution supply unit includes a solution supplier and a solution quantitative vessel for measuring the solution quantity of the solution to be supplied from said solution supplier to said preparation vessel, and said diluent supply unit includes a diluent supplier, a diluent quantitative vessel for measuring the diluent quantity to be supplied from said diluent supplier to said preparation vessel, and a quantitative pump for measuring diluent quantity to be added to said preparation vessel from said diluent supplier.

2. The apparatus for diluting a solution of claim 1, further comprising:

a storage vessel for receiving the solution from the preparation vessel and storing the received solution; and a liquid level sensor for detecting a quantity of the solution in the storage vessel, wherein the controller transfers the diluted solution from the preparation vessel to the storage vessel when the solution in the preparation vessel reaches the desired concentration and the quantity of the diluted solution in the storage vessel detected by the liquid level sensor becomes lower than a predetermined level.

3. The apparatus for diluting a solution of claim 2, wherein the storage vessel has a circulation passage with a pump and a filter for purifying the stored solution.

4. The apparatus for diluting a solution of claim 2 further comprising:

a supply vessel for receiving the solution from the storage vessel and supplying the solution to a plurality of analyzers.

5. The apparatus of claim 2, wherein said controller controls the solution and diluent supply units to supply the solution and diluent into the preparation vessel when the preparation vessel become empty to restart dilution of the solution.

6. The apparatus for diluting a solution of claim 1, wherein the preparation vessel is provided with a stirrer for stirring the solution therein.

7. The apparatus for diluting a solution of claim 1, wherein the concentration sensor includes a sensor for detecting an electric conductivity of the solution.

8. The apparatus for diluting a solution of claim 1, wherein the preparation vessel is provided with a drain valve for discharging the solution from the preparation vessel and the controller operates the drain valve to discharge the solution from the preparation vessel when the solution concentration in the preparation vessel measured by the concentration sensor becomes lower than the desired concentration.

9. The apparatus for diluting a solution of claim 1, wherein the controller calculates the additional quantity of diluent in terms of the number of operations of the quantitative pump and operates the quantitative pump to add the diluent less times than the calculated number of operations.

10. A method of diluting a solution comprising:

providing a preparation vessel for mixing a solution with a diluent to dilute the solution, a solution supply unit for measuring a quantity of the solution to supply the solution into the preparation vessel, a diluent supply unit for measuring a quantity of the diluent to supply the diluent into the preparation vessel and a concentration sensor for measuring a concentration of the diluted solution in the preparation vessel;

supplying the solution and diluent into the preparation vessel in such quantity that the concentration of the diluted solution is higher than a desired concentration;

calculating an additional quantity of the diluent necessary for diluting the solution in the preparation vessel to the desired concentration based on a difference between the concentration measured by the concentration sensor and the desired concentration;

adding the diluent into the preparation vessel in smaller quantity than the calculated additional quantity; and repeating the calculation and addition until the solution concentration in the preparation vessel reaches the desired concentration.

* * * * *